United States Patent
Okada et al.

(10) Patent No.: US 9,618,416 B2
(45) Date of Patent: Apr. 11, 2017

(54) METHOD OF CALIBRATING MULTI COMPONENT FORCE DETECTOR PROVIDED IN ROLLING RESISTANCE TESTING MACHINE

(75) Inventors: Toru Okada, Hyogo (JP); Takayuki Fukuda, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 989 days.

(21) Appl. No.: 13/990,024

(22) PCT Filed: Dec. 9, 2011

(86) PCT No.: PCT/JP2011/078613
§ 371 (c)(1), (2), (4) Date: May 28, 2013

(87) PCT Pub. No.: WO2012/081525
PCT Pub. Date: Jun. 21, 2012

(65) Prior Publication Data
US 2013/0253852 A1    Sep. 26, 2013

(30) Foreign Application Priority Data

Dec. 15, 2010   (JP) .................................. 2010-279201

(51) Int. Cl.
*G01L 25/00* (2006.01)
*G01M 17/02* (2006.01)

(52) U.S. Cl.
CPC ......... *G01L 25/003* (2013.01); *G01M 17/021* (2013.01); *G01M 17/02* (2013.01)

(58) Field of Classification Search
CPC ...................... G01L 5/16; G01L 25/00; G01M 17/013–17/02
See application file for complete search history.

(56) References Cited

U.S. PATENT DOCUMENTS

| 4,134,292 A | 1/1979 | Honlinger et al. |
| 4,748,844 A | 6/1988 | Yoshikawa et al. |

(Continued)

FOREIGN PATENT DOCUMENTS

| DE | 2709682 A1 | 9/1978 |
| EP | 1336833 A2 | 8/2003 |

(Continued)

OTHER PUBLICATIONS

Germana Paterlini, "Rolling Resistance Validation", Jul. 2015, Minnesota Department of Transportation, 2015-39, pp. 1-44.*

(Continued)

*Primary Examiner* — Mischita Henson
(74) *Attorney, Agent, or Firm* — Studebaker & Brackett PC

(57) ABSTRACT

A crosstalk correction coefficient of a multi component force detector provided in a rolling resistance testing machine is calibrated. A method of calibrating a multi component force detector provided in a rolling resistance testing machine including a spindle shaft to which a tire is attached, a running drum with a simulation road surface on which the tire is pressed, and a rotation torque meter provided in a rotation shaft of the running drum; in which, in performing a process of calculating a force acting on the tire from a measurement value of the multi component force detector by using a crosstalk correction coefficient that corrects an influence of crosstalk occurring in the multi component force detector, the crosstalk correction coefficient is calibrated by using a rolling test data including a rotation torque measured by the rotation torque meter and a force measured by the multi component force detector.

6 Claims, 4 Drawing Sheets

(56) References Cited

U.S. PATENT DOCUMENTS

| | | | |
|---|---|---|---|
| 7,832,288 B2 | 11/2010 | Caretta et al. | |
| 2003/0154778 A1 | 8/2003 | Meinen | |
| 2009/0125251 A1 | 5/2009 | Caretta et al. | |
| 2011/0000292 A1* | 1/2011 | Yoshikawa | G01M 17/021 73/146 |

FOREIGN PATENT DOCUMENTS

| | | |
|---|---|---|
| EP | 2249138 A1 | 11/2010 |
| JP | 59-151032 | 8/1984 |
| JP | 61-116637 | 6/1986 |
| JP | 61116637 A | 6/1986 |
| JP | 62-263434 A | 11/1987 |
| JP | 2003-004598 A | 1/2003 |
| JP | 2003-294554 A | 10/2003 |
| JP | 2009-204324 A | 9/2009 |
| JP | 2009-222639 A | 10/2009 |
| WO | 2005108945 A1 | 11/2005 |
| WO | 2009/116513 A1 | 9/2009 |
| WO | 2010-101159 A1 | 9/2010 |

OTHER PUBLICATIONS

Sauret et al., "Assessment of field rolling resistance of manual wheelchairs", 2012, VA Health Care, vol. 49 No. 1, pp. 63-74.*
Wang et al., "Effect of Friciton on Rolling Tire—Pavement Interaction", no date, NEXTRANS Project No. 049IY02, pp. 1-45.*
Japanese Office Action 'Notification of Reason for Refusal' dated on Jan. 15, 2013, which corresponds to Japanese Patent Application No. 2010-279201 and is related to U.S. Appl. No. 13/990,024; with translation.
International Search Report; PCT/JP2011/078613; Feb. 7, 2012.
Written Opinion of the International Searching Authority; PCT/JP2011/078613; Feb. 7, 2012.
The extended European search report issued on Apr. 25, 2014, which corresponds to European Patent Application No. 11849114.1-1557 and is related to U.S. Appl. No. 13/990,024.

* cited by examiner

METHOD OF CALIBRATING MULTI COMPONENT FORCE DETECTOR PROVIDED IN ROLLING RESISTANCE TESTING MACHINE

TECHNICAL FIELD

The present invention relates to a method of calibrating a multi component force detector provided in a rolling resistance testing machine.

BACKGROUND ART

A rolling resistance of a tire is one of important measurement items for measuring characteristics and performances of tires for a truck, an automobile, and the other vehicles. The rolling resistance of the tire is a force acting between the tire and the ground surface in the tangential direction, and is measured as a force Fx (a change in the rolling resistance Fx when a pressing load Fz is changed) acting between a test tire and a simulation road surface of a drum or the like in the tangential direction in a rolling resistance testing machine.

A typical method of measuring the rolling resistance Fx is a method using a drum type rolling resistance testing machine. The drum type rolling resistance testing machine is configured to measure a relation between the pressing load Fz and the rolling resistance Fx by a multi component force detector (load cell) provided in a spindle shaft supporting a tire while the tire is pressed against a simulation road surface formed in the outer periphery of a running drum.

Specifically, in a case where the rolling resistance Fx is measured, the load fx in the rolling resistance direction is measured by the multi component force detector provided in the spindle shaft, and Fx may be calculated by "Fx=fx(L/Rd)" (a load method). Here, Rd indicates the radius of the running drum, and L indicates the distance between the axes of the running drum and the tire spindle shaft. Further, as another method, there is known a method in which a driving torque τ for rotating the running drum is measured and the rolling resistance Fx is measured by "Fx=τ/Rd" (a torque method).

Incidentally, in such a rolling resistance testing machine, there is a need to calibrate the multi component force detector for using the testing machine. In addition, when the multi component force detector is used for a long period of time, a detection value may have an error. Thus, for example, the multi component force detector needs to be calibrated every predetermined usage period.

Various methods of calibrating the multi component force detector have been developed. However, as illustrated in Patent Document 1, a calibration may be performed after adding a test load in respective directions using a weight of a given mass. Further, as illustrated in Patent Document 2 or Patent Document 3, there is disclosed a method of performing a calibration by applying an external force through a highly precise load detector.

CITATION LIST

Patent Document

Patent Document 1: JP 59-151032 A
Patent Document 2: JP 61-116637 A
Patent Document 3: JP 2003-4598 A

DISCLOSURE OF THE INVENTION

Technical Problem

Incidentally, in a measurement instrument that simultaneously measures a plurality of forces (a translation load component or a moment component) such as the multi component force detector a phenomenon called "crosstalk" occurs in which a load (a false load) is measured also in a direction different from the direction of the originally applied load.

Particularly, in the multi component force detector provided in the rolling resistance testing machine, the crosstalk causes a problem such that a pressing load influences a rolling load.

That is, the pressing load Fz of the tire becomes a load which is generally an order of about 100 times of the rolling resistance Fx, and the lateral force Fy of the tire becomes a load which, is an order of about 10 times of Fx. Further, since the axis of the tire is present at a position offset from the multi component force detector due to the structure thereof, the moment mx acts with a relatively large value on the multi component force detector due to the load Fz. Thus, the influence of the crosstalk may not be ignored, and the output value fx' in the x direction of the multi component force detector is influenced by the load other than the x direction, so that a correct value cannot be obtained. Further, if the direction of applying the axial load (pressing load) is deviated even slightly, the test condition changes, so that the calibration test may not be satisfactorily performed. For example, for applying the axial load Fz of 5000 N, when an error of 0.1° exists in the pressing direction, a load of 9 N is unnecessarily applied in the x direction, so that the test condition becomes different from the desired test condition. Of course, in such an unstable test condition, it is difficult to highly precisely calibrate the crosstalk correction coefficient.

In order to investigate the crosstalk, it is conceivable to, by using the technique of Patent Document 1, apply a method a given load in the x direction so as to measure the influence of the loads in the directions of the y axis and the z axis. However, in this method, a calibration test for Fy and Fz or Mx, My, and Mz is needed in addition to Fx as a value to be applied to the multi component force detector, and hence time and effort are required. Thus, this method is not practical.

Patent Documents 2 and 3 described above disclose a part of a method of calibrating the multi component force detector taking the influence of the crosstalk into consideration, but do not disclose a specific approach. Thus, the technique cannot be employed to the actual industrial field.

The present invention is derived in view of the above-described problems, and it is an object of the present invention to provide a calibration method that enables simple and highly precise calibration of a crosstalk correction coefficient of a multi component force detector provided in a rolling resistance testing machine.

Solution to Problem

In order to achieve the above-described object, the present invention provides the following technical means.

That is, according to an aspect of the invention, there is provided a method of calibrating a multi component force detector provided in a rolling resistance testing machine including a spindle shaft to which a tire is attached, a running drum with a simulation road surface on which the tire is pressed, and a rotation torque meter provided in a rotation shaft of the running drum: in which, in performing a process of calculating a force acting on the tire from a measurement value of the multi component force detector using a crosstalk correction coefficient for correcting an influence of crosstalk occurring in the multi component force detector, the crosstalk correction coefficient is calibrated by using a "rolling test data" including a rotation torque measured by the rotation torque meter and a force measured by the multi component force detector.

The present inventors supposed that, if the rolling resistance that is calculated by using the rotation torque meter presents high precision on the ground that the rotation torque meter may be calibrated with relatively high precision differently from the multi component force detector. Then, the present inventors have found that the calibration may be simply and highly precisely performed when the crosstalk correction coefficient is calibrated so that the rolling resistance calculated by the multi component force detector becomes equal to the rolling resistance calculated by the rotation torque meter provided in the running drum. Thus, the present invention was achieved.

Furthermore, the above-described calibration method corresponds to the method of making a transformation matrix so that the rolling resistance calculated by the multi component force detector becomes equal to the rolling resistance calculated by the rotation torque meter of the running drum.

With the calibration method, the calibration of the rotation torque meter may be highly precisely performed, and hence the rolling resistance calculated by the rotation torque meter presents high precision. Further, regarding the multi component force detector, as to the load (for example, fx or fz) measured in the same direction as that of the pressing load, the pressing direction and the measurement direction are basically the same direction, and an influence of an error of an angle for applying the pressing load is small. Accordingly, the measurement value may be relatively easily and accurately obtained. Therefore, only the crosstalk influence degree (crosstalk correction coefficient) is calculated through a comparison between the output of the multi component force detector and the output of the rotation torque meter using the above-described technical means. In this way, highly precise calibration may be performed by sampling data as many as the number of at least unknown coefficients.

Preferably, the multi component force detector may be attached to the spindle shaft, and when a tangential direction of the running drum is set as an x axis, an axis direction of the spindle shaft is set as a y axis, and a direction of a load applied to the tire is set as a z axis, the multi component force detector may measure, among forces fx, fy, and fz acting in the respective axis directions and moments mx, my; and mz about the respective axes, at least two or more components including fx and fz.

Preferably, when the multi component force detector is able to measure fx, fz, and mx, the crosstalk correction coefficients of fz and mx with respect to fx may be calibrated by using at least two kinds of "rolling test data" which include fx, fz, and mx and are linearly independent from one another.

The crosstalk of fz and mx easily influences fx among the load and the moment measured by the multi component force detector. Thus, in the multi component force detector capable of detecting at least fx, fz, and nix, the crosstalk correction coefficients of fz and mx with respect to fx may be calibrated.

Preferably, when the multi component force detector is able to measure fx, fz, and fy, the crosstalk correction coefficients of fz and fy with respect to fx may be calibrated by using at least two kinds of "rolling test data" which include fx, fz, and fy and are linearly independent from one another. The mx measured by the multi component force detector includes the sum of the tire radius r and fy, and has a high relation with the lateral force fy of the tire. Thus, in the multi component force detector measuring the translation loads of fx, fy, and fz, the crosstalk correction coefficients of fz and fy with respect to fx may be calibrated by using fy instead of mx.

Preferably, when the multi component force detector is able to measure fx, fz, fy, and mx, the crosstalk correction coefficients of fz, fy, and mx with respect to fx may be calibrated by using at least three kinds of "rolling test data" which include fx, fz, fy, and mx and are linearly independent from one another.

In the multi component force detector capable of measuring all fx, fz, fy, and mx described above, the multi component force detector may be further highly precisely calibrated by calibrating all the crosstalk correction coefficients of fz, fy, and mx with respect to fx.

Further, a "differential load" may be obtained by subtracting a measurement value of the multi component force detector obtained when the tire is pressed at a load different from a test load from a measurement value of the multi component force detector obtained when the tire is pressed against the running drum at the test load, and the crosstalk correction coefficient may be calibrated by using the obtained "differential load" as the "rolling test data".

The spindle shaft to which the tire is attached, the bearing provided in the rotation shaft of the rotation drum, and the like is significantly influenced by rotational friction. When the rotational friction is added to the measurement value of the rolling resistance, it is difficult to measure fx or calibrate the crosstalk correction coefficient with high precision. Therefore, when the crosstalk correction coefficient is calibrated by using the differential load obtained by subtracting the state where a load (for example, the skim load) different from the test load is applied from the state where the test load is applied, the calibration may be performed without the influence of the rotational friction, and hence the crosstalk correction coefficient may be calibrated with high precision.

Effect of the Invention

According to a method of calibrating a multi component force detector provided in a rolling resistance testing machine of the present invention, it is possible to simply and highly precisely calibrate the crosstalk correction coefficient of the multi component force detector provided in the rolling resistance testing machine.

DESCRIPTION OF EMBODIMENTS

Figure 1A:
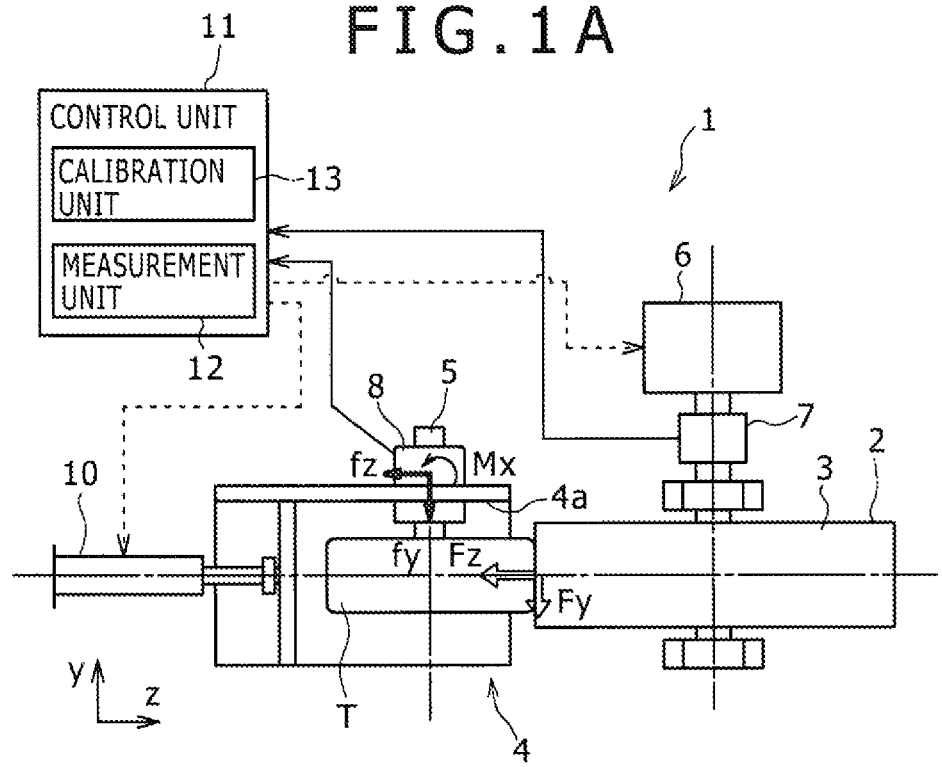
FIG. 1A is a plan view of a rolling resistance testing machine provided with a multi component force detector which is calibrated by a calibration method according to the present invention.

Hereinafter, a rolling resistance testing machine 1 provided with a multi component force detector which is calibrated by a calibration method according to the present invention will be described with reference to the drawings.

A rolling resistance testing machine 1 of the present invention includes a cylindrical running drum 3 of which the outer peripheral surface is provided with a simulation road surface 2 on which a tire T (test tire) runs and a carriage 4 that presses the tire T against the simulation road surface 2 of the running drum 3. The carriage 4 is a slide base which is provided with a spindle shaft 5 rotatably holding the tire T, and is disposed so as to be away from the running drum 3 in the horizontal direction.

Figure 1B:
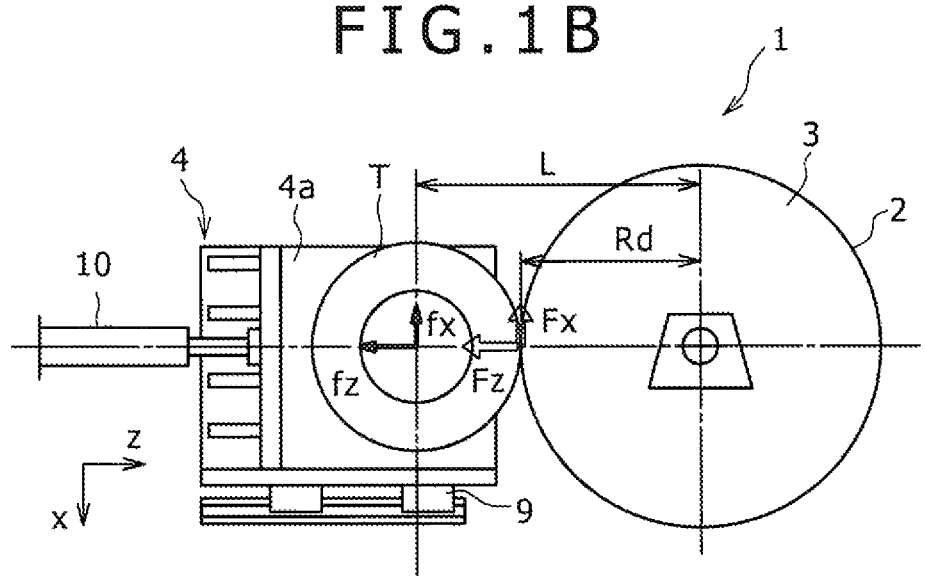
FIG. 1B is a front view of the rolling resistance testing machine of FIG. 1A
Figure 2:
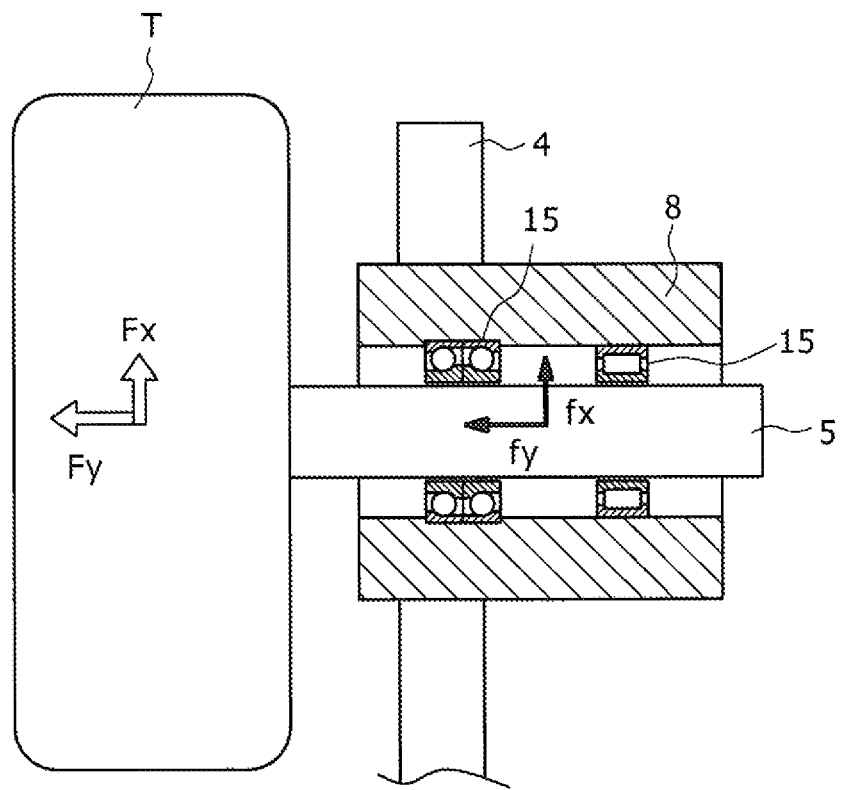
FIG. 2 is an enlarged view of a spindle shaft.

In the description below, the left side of FIG. 1B is set as the left side and the right side of FIG. 1B is set as the right side for describing the rolling resistance testing machine 1.

The running drum 3 is a cylindrical body which is rotatably attached to a shaft set along the horizontal direction perpendicular to the left to right direction, and the outer peripheral surface thereof is provided with the endless simulation road surface 2 on which the tire T may roll. To the rotation, shaft of the running drum 3, a rotation torque meter 7 and a motor 6 for rotating the running drum 3 are attached, and the running drum 3 may he driven by the motor 6 through the rotation torque meter 7. The rotation torque meter 7 may measure a torque generated by the running drum 3.

Furthermore, the rotation torque meter 7 may be detachable from the drive shaft of the motor 6. In this configuration, the rotation torque meter 7 is detached from the drive shaft during a normal test, and is attached to the drive shaft only during a test of calibrating a crosstalk correction coefficient to be described later.

For example, in the state where the running drum 3 permanently provided with the rotation torque meter 7 is rapidly accelerated or decelerated for measuring the rolling resistance, a large amount of torque acts on the rotation torque meter 7. Thus, as the permanently installed rotation torque meter 7, there is need to use a torque meter having a large load capacity, that is, a torque meter with low measurement accuracy. However, if the running drum is not permanently provided with the rotation torque meter 7, a rapid acceleration or a rapid deceleration is not necessary within the range of the calibration test. Accordingly, the rotation torque meter 7 with high measurement accuracy and a low load capacity can be used. In general, the low-load-capacity rotation torque meter is inexpensive compared to the high-load-capacity rotation torque meter.

Meanwhile, the carriage 4 is a slide base with a structure having an excellent rigidity so as not to be easily deformed even when a load is applied thereto. A hollow cylindrical housing 8, into which the spindle shaft 5 is inserted, is provided in a vertical wall portion 4a of the carriage 4 in a manner that the axis of the carriage 4 is parallel to the axis of the running drum 3. The spindle shaft 5 is rotatably inserted into the inner peripheral surface of the housing 8 through a bearing 15.

A linear guide 9 which moves horizontally along the left to right direction in the carriage 4 is provided at the lower portion of the carriage 4. Further, a hydraulic cylinder 10 which moves the carriage 4 in the horizontal direction and may press the tire T attached to the spindle shaft 5 against the running drum 3 is disposed at the left side of the carriage 4.

Furthermore, the above-described spindle shaft 5 is a shaft member that may hold the tire T at the front end thereof, and is attached to the cylindrical housing 8 while being rotatably inserted into a shaft facing the horizontal direction. The rotation axis of the spindle shaft 5 is disposed so as to be parallel to the rotation axis of the running drum 3 at the same height in the up to down direction. Here, when the carriage 4 is moved horizontally, the tire T attached to the spindle shaft 5 is pressed against the simulation road surface 2 of the running drum 3 from the normal direction thereof. A multi component force detector is attached to the housing 8 which rotatably supports the spindle shaft 5.

The multi component force detector (not illustrated) is formed in a disk shape in appearance, and includes a plurality of beam members (distorted elements) which extend radially from the center in the radial direction and load cells which are attached thereto. The bearing 15 is disposed at the center of the multi component force detector, and the multi component force detector rotatably supports the spindle shaft 5. The outer peripheral portion of the multi component force detector is connected to the end of the housing 8.

By setting the coordinate axes illustrated in FIGS. 1A and 1B, that is, the z axis facing the movement direction (the axial load application direction) of the carriage 4, the y axis identical to the axis of the spindle shaft 5, and the x axis facing the direction perpendicular to the z axis and the y axis and the tangential direction of the outer periphery of the running drum 3, the multi component force detector includes two or more components including at least fx and fz among the loads (fx, fy, and fz) along the coordinate axes and the moments (mx, my, and mz) about the coordinate axes. For expressing the force acting on the tire T, the capital letter F is used (for example, Fx, Fy, and Fz).

The measurement values of the load and the torque measured by the multi component force detector are transmitted to a control unit 11.

As illustrated in FIG. 1A, the control unit 11 controls the hydraulic cylinder 10 which presses the carriage 4 against the running drum 3 or the motor 6 which rotationally drives the running drum 3.

Further, the control unit 11 includes a measurement unit 12 which calculates an actual rolling resistance Fx and the like based on the measurement data measured by the multi component force detector. The measurement unit 12 receives a load measurement value or a torque measurement value such as fx', fz', and mx' measured by the multi component force detector and calculates the load fx by using Equation (1) to be described later. Furthermore, in Equation (1), the coefficients a, b, and the like exist, but these coefficients a and b are the coefficients for correcting the influence of the crosstalk in the multi component force detector. To accurately learn the coefficients a and b, that is, to accurately calibrate the coefficients a and b is essentially needed to accurately calculate fx in the measurement unit 12.

In the case where the rolling resistance testing machine 1 is used for a long period of time even when the coefficients a, b, and the like are accurately calibrated, the value fx or the like becomes not accurate, so that the actual rolling resistance Fx is not obtained. Such a circumstance may be caused by various factors. However, it is considered that one of the factors is caused by the inaccurate values of the coefficients a and b.

Therefore, the control unit 11 provided in the rolling resistance testing machine 1 of the invention is provided with a calibration unit 13 which calibrates the coefficients a and b for correcting the influence of the crosstalk and accurately calculates fx.

Next, a signal process which is performed by the calibration unit 13 provided inside the control unit 11, that is, a method of calibrating the multi component force detector of the invention will be described.

A method of calibrating a multi component force detector of the invention is characterized in that the crosstalk correction coefficients a and b are calibrated by using "rolling test data" including a rotation torque measured by the rotation torque meter 7 and a force measured by the multi component force detector for performing a process of calculating a force acting on the tire T from the measurement value of the multi component force detector using the crosstalk correction coefficients a and b for correcting the influence of the crosstalk occurring in the multi component force detector.

Specifically, in the method of calibrating the multi component force detector of the invention, a first embodiment to a fourth embodiment may be conceived in accordance with the type of load or torque measured by the multi component force detector, that is, the "rolling test data" obtained from the multi component force detector.

[First Embodiment]

First, a method of calibrating a multi component force detector according to a first embodiment will be described.

The calibration method of the first embodiment is employed when the multi component force detector capable of measuring fx, fz, and mx is used.

The calibration of the crosstalk correction coefficient a of the axial load fz with respect to fx and the crosstalk correction coefficient b of mx is performed according to the following procedure.

Figure 3:
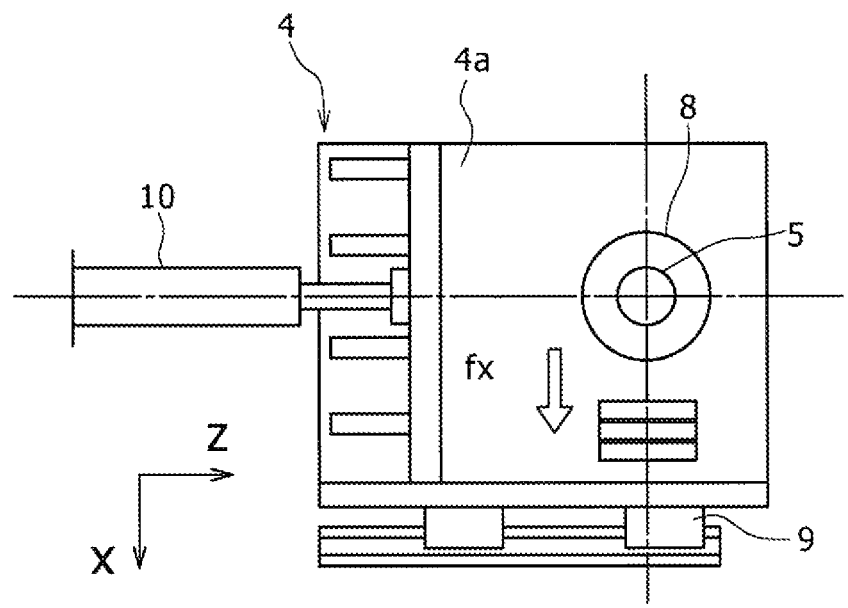
FIG. 3 is a diagram illustrating a calibration method of calibrating a load component in the x direction by using a weight of a given mass.

First, as illustrated in FIG. 3, a weight of a given mass is attached to the spindle shaft 5, a load is applied in the x direction, a load applied in the same direction is measured by the multi component force detector, and then a calibration is performed. In this way a calibration coefficient a of the measurement value fx' of the multi component force detector with respect to fx may be obtained.

Figure 4:
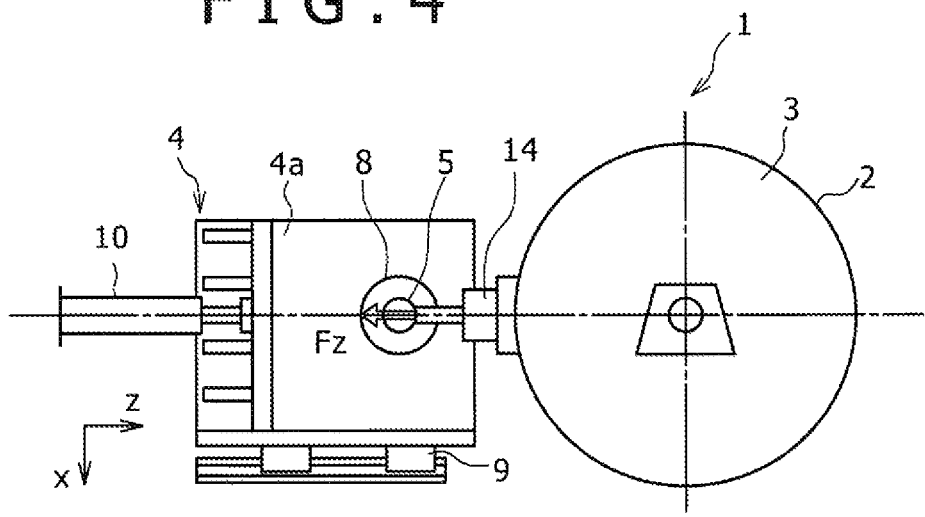
FIG. 4 is a diagram illustrating a calibration method of applying a load in the z direction.

Further, as illustrated in FIG. 4, a highly precise load detector 14 is provided between the spindle shaft 5 and the running drum 3, and the carriage 4 is operated in the direction of the running drum 3 so as to apply a pressing load fz (=Fz and a drum load) to the spindle shaft 5 in the z direction.

In this state, the actual axial load fz is calibrated by obtaining a calibration coefficient in the same way as the case of the rolling resistance from the measurement value of the load fz' output from the multi component force detector and the signal of the load fz of the load detector 14, for example.

Furthermore, in the calibration test illustrated in FIG. 4, the crosstalk correction coefficient a may be obtained. However, since the pressing load fz is a large value compared to fx, an unnecessary load of a magnitude which cannot be ignored is applied in the fx direction even when a slight installation error is present in the hydraulic cylinder 10. Accordingly, it is difficult to obtain the crosstalk correction coefficient of fz' with respect to fx from the calibration test in which the load fz is applied in the z direction as illustrated in FIG. 4.

Thus, in this embodiment, the following method is employed for the calibration of the crosstalk correction coefficient.

First, fx is expressed by Equation (1) using the crosstalk correction coefficients a and b and the calibration coefficient a obtained by the method of FIG. 3.

$$fx = \alpha \cdot fx' + a \cdot fz' + b \cdot mx' \quad (1)$$

Furthermore, in Equation (1), the coefficient a is a coefficient which indicates the influence degree of the crosstalk caused by the measurement value fz' in the z direction, and is a crosstalk correction coefficient of fz'. The coefficient b is a coefficient which indicates the influence degree of the crosstalk caused by the measurement value mx' of the moment about the x axis, and is a crosstalk correction coefficient of mx'.

Meanwhile, fx is expressed by Equation (2) when the measurement value of the rotation torque of the running drum 3 is denoted by τ and the distance between the axes of the tire T and the running drum 3 is denoted by L. Furthermore, the calibration of the rotation torque meter 7 is performed in advance by a dedicated inspection device while being detached from the testing machine, and hence the rotation torque meter outputs an accurate measurement value.

$$fx = \tau/L \quad (2)$$

By setting fx obtained from Equation (1) to be equal to fx obtained from Equation (2), the specific numerical values of the crosstalk correction coefficients a and b may be calculated.

$$\tau/L = \alpha \cdot fx' + a \cdot fz' + b \cdot mx' \quad (1)'$$

Here, since the values of the two coefficients a and b are not given in Equation (1), there is a need to obtain at least two kinds or more "rolling test data" which are linearly independent from each other in order to obtain two crosstalk correction coefficients a and b. When two kinds or more "rolling test data" which are linearly independent from each other may be obtained, an independent quadratic simultaneous equation based on Equation (1)' may be obtained, and hence variables a and b may be calculated.

In order to obtain the "rolling test data", for example, two "rolling test data" which are linearly independent from each other may be obtained in a manner such that the test data are respectively sampled by attaching one tire T in the front direction and the rear direction.

Furthermore, the method of obtaining the "rolling test data" which are linearly independent from each other is not limited to the method of changing the attachment direction of the tire T. For example, the "rolling test data" which are linearly independent from each other may be obtained even when the test data of respective tires T are sampled by preparing two tires having different rolling characteristics. Further, the test data in the forward rotation and the test data in the backward rotation may be sampled by attaching one tire T to the spindle shaft 5. Furthermore, since the data items which are obtained by changing the rotation speed or the pressing load of one tire T are not linearly independent from each other, the data is not the "rolling test data" according to the present invention.

Further, the crosstalk correction coefficients a and b may be further highly precisely calculated by sampling the rolling test data a plurality of times (three times or more) and processing the obtained rolling test data using a least-square method.

According to the calibration method of the first embodiment, the crosstalk correction coefficients a and b of the multi component force detector provided in the rolling resistance testing machine 1 may be highly precisely calibrated without spending any trouble or time, and hence fx may be accurately obtained.

[Second Embodiment]

Next, a method of calibrating a multi component force detector according to a second embodiment will be described.

The calibration method of the second embodiment uses a multi component force detector capable of measuring fx, fz, and fy differently from that of the first embodiment, and performs a calibration of the crosstalk correction coefficient a of fz' and the crosstalk correction coefficient c of fy' with respect to fx.

The calibration of the crosstalk correction coefficients a and c of the second embodiment is performed according to the following procedure.

First, the calibration coefficient a of the measurement value fx' in the rolling resistance direction with respect to fx is obtained as in the first embodiment as illustrated in FIG. 3.

Next, the force fx in the rolling resistance direction is expressed by Equation (3) in consideration of the influence of the crosstalk of fy' instead of mx', Furthermore, c in Equation (3) is the crosstalk correction coefficient caused by the measurement value fy' in the y direction.

$$fx = \alpha \cdot fx' + a \cdot fz' + c \cdot fy' \quad (3)$$

Meanwhile, fx may be expressed by Equation (2) using the measurement value of the rotation torque meter 7. Thus, Equation (3)' may be derived by setting the right side of Equation (3) to be equal to the right side of Equation (2).

$$\tau/L = \alpha \cdot fx' + a \cdot fz' + c \cdot fy' \quad (3)'$$

Even in Equation (3)', since the values of the two coefficients a and c are not given, there is a need to obtain at least two kinds of "rolling test data" which are linearly independent from each other in order to obtain two crosstalk correction coefficients a and c. When two kinds of "rolling test data" which are linearly independent from each other can be obtained, an independent quadratic simultaneous equation based on Equation (3)' may be obtained, and hence variables a and c may be calculated.

The "rolling test data" which are linearly independent from each other may be obtained by the same method as that of the first embodiment. For example, the test data may respectively be sampled by attaching one tire T in the front direction and the rear direction.

The effect obtained by the calibration method of the second embodiment is substantially the same as that of the calibration method of the first embodiment, and hence the description will not be repeated.

Incidentally, the moment mx about the x axis is expressed by Equation (4) when the distance from the center of the multi component force detector to the center of the tire T in the y direction is denoted by Lt and the radius of the tire T is denoted by Rt.

$$mx = -Lt \cdot Fz - Rt \cdot Fy \quad (4)$$

As understood from Equation (4), when the tire diameter Rt is constant, mx and Fy have a linear relation therebetween, which means a significant relation with the lateral force fy of the tire T. That is, even when the crosstalk correction coefficient is calibrated by using fy instead of mx, the crosstalk correction coefficient may be obtained with high precision as in the first embodiment.

Furthermore, when the tire diameter Rt largely changes, mx and Fy have a linear independent relation. For this reason, as illustrated in the following third embodiment, there is a need to take both the crosstalk correction coefficient b of mx' and the crosstalk correction coefficient c of fy' with respect to fx into consideration at the same time.

[Third Embodiment]

Next, a method of calibrating a multi component force detector according to a third embodiment will be described.

The calibration method of the third embodiment uses a multi component force detector capable of measuring all fx, fz, fy, and mx differently from the first and second embodiments, and performs a calibration of all the crosstalk correction coefficients a, b, and c.

The calibration of the crosstalk correction coefficients a, b, and c of the third embodiment is performed according to the following procedure.

First, the calibration coefficient α of the measurement value fx' in the rolling resistance direction with respect to fx is obtained as in the first embodiment and the second embodiment as illustrated in FIG. 3.

In consideration of the calibration coefficient α or the crosstalk correction coefficients a, b, and c, fx of the embodiment is expressed by Equation (5), $$fx = \alpha \cdot fx' + a \cdot fz' + b \cdot mx' + c \cdot fy' \quad (5)$$

Equation (5)' may be derived based on Equation (5) and Equation (2) using the measurement value of the rotation torque meter 7.

$$\tau/L = \alpha \cdot fz' + a \cdot fz' + b \cdot mx' + c \cdot fy' \quad (5)'$$

In Equation (5)' obtained in this way, the values of three variables are not given, and hence there is a need to obtain three kinds of "rolling test data" which are linearly independent from each other in order to solve this equation (in other words, to obtain a calibration matrix from the calibration coefficient).

Further, in order to obtain three kinds of "rolling test data", for example, the "rolling test data" may be sampled by using the tires T having different diameters. The crosstalk correction coefficients a, b, and c may be further highly precisely calculated by sampling a plurality of (four or more) rolling test data and processing the sampled rolling test data using a least-square method. It is possible to evaluate whether the plurality of rolling test data become a linear independent data group by a singular value decomposition.

By the above-described method, all the crosstalk correction coefficients a, b, and c are calibrated. For this reason, Ix may be further highly precisely measured and hence the actual rolling resistance Fx may be accurately obtained.

[Fourth Embodiment]

Next, a method of calibrating a multi component force detector of a fourth embodiment will be described.

In performing the calibration methods of the first embodiment to the third embodiment, the spindle shaft 5 attached with the tire T or the bearing provided in the rotation shaft of the rotation drum is significantly influenced by a rotational friction. When the rotational friction is added to the measurement value of the rolling resistance, there is a case in which the measurement of fx' or the calibration of the crosstalk correction coefficient may not be easily performed with high precision. In such a case, the calibration method described in the fourth embodiment is effective.

Figure 5:
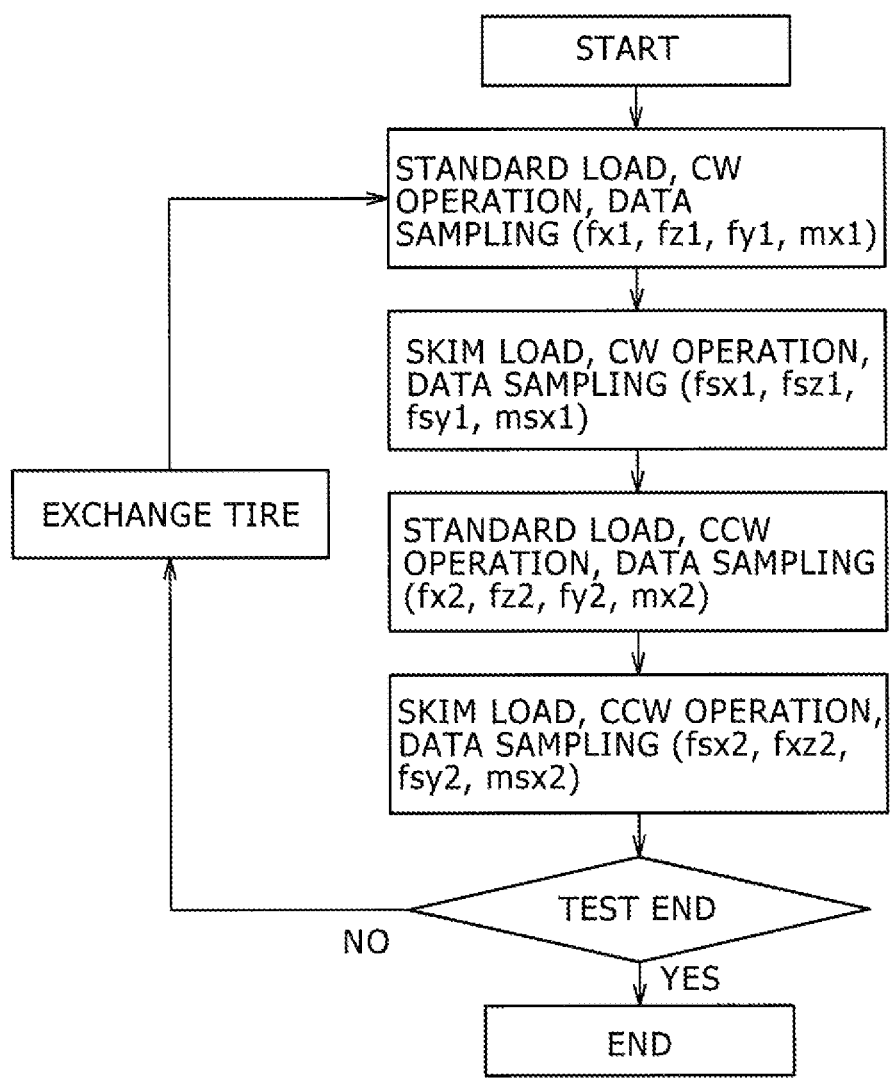
FIG. 5 is a flowchart illustrating a calibration method according to a fourth embodiment.

That is, as illustrated in FIG. 5, in the calibration method of the fourth embodiment, a calibration is performed by inputting a "differential load" obtained by subtracting a measurement value obtained by a skim load (a load different from a test load) from a measurement value in which an axial load (a pressing load in the z direction) is obtained by the test load instead of directly inputting the measurement value measured by the multi component force detector to fx', fz', fy', and mx' used to obtain the "rolling test data" in the first embodiment to the third embodiment.

The calibration of the crosstalk correction coefficient of the third embodiment is performed according to the following procedure.

First, as in the first embodiment and the second embodiment, the calibration coefficient a of the measurement value fx' of the rolling resistance with respect to the actual rolling resistance a is obtained.

Then, the tire T is rotated as the clockwise rotation CW (the forward rotation direction) while the tire T is pressed against the running drum 3 at the standard load (for example, 5000 N), and fx1, fz1, fy1, and mx1 are measured by the multi component force detector.

Next, the load that presses the tire T against the running drum 3 is changed to the skim load (for example, 100 N) smaller than the standard load, the tire T is rotated in the clockwise rotation CW while the tire T is pressed against the running drum 3 at the skim load, and fsx1, fsz1, fsy1, and msx1 are measured by the multi component force detector. At this time, the rolling resistance represents a small value. Furthermore, the tire running speed is set to be equal except for the condition of the axial load.

In both the skim load and the standard load, the load component or the torque component caused by the rotational friction generated in the spindle shaft 5 or the bearing of the running drum 3 overlaps as an error amount. For this reason, as illustrated in Equation (7), when the measurement value obtained by the skim load is subtracted from the measurement value obtained by the test load, fx1', fz1', fy1', and mx1' may be obtained with higher precision.

$$fx1'=fx1-fsx1$$

$$fz1'=fz1-fsz1$$

$$fy1'=fy1-fsy1$$

$$mx1'=mx1-msx1 \quad (7)$$

By applying fx1', fz1', fy1', and mx1' obtained as described above to fx', fz', fy', and mx' of Equation (1)', Equation (3)', and Equation (5)', the calibration coefficient may be obtained by the methods of the first embodiment to the third embodiment.

Furthermore, as illustrated in FIG. 5, for obtaining a plurality of "rolling test data" which are linearly independent from each other, the load component or the torque component is measured twice for each of the test load and the skim load while first rotating the tire T in the forward rotation direction and reversing the rotation direction of the tire T as the counter-clockwise rotation (CCW). Then, different rolling test data may be sampled in Equation (8).

$$fx2'=fx2-fsx2$$

$$fz2'=fz2-fsz2$$

$$fy2'=fy2-fsy2$$

$$mx2'=mx2-msx2 \quad (8)$$

By applying fx2', fz2', fy2', and mx2' obtained as described above to fx', fz', fy', and mx' of Equation (1)', Equation (3)', and Equation (5)', the calibration coefficient may be obtained by the methods of the first embodiment to the third embodiment.

The "rolling test data" obtained as described above are the data obtained by subtracting the load component or the torque component caused by the rotational friction generated in the spindle shaft 5 or the bearing of the running drum 3. Thus, when the data items having reduced error components are used the crosstalk correction coefficient may be further reliably and highly precisely calibrated.

Furthermore, it should be considered that all embodiments disclosed herein are examples and do not limit the invention. Particularly, in the embodiments disclosed herein, the content which is not specifically described, for example, a running condition, an operation condition, various parameters, a component dimension, a component weight, a component volume, or the like does not deviate from the scope which is normally set by the person skilled in the art, and employs a value which may be easily supposed by the person skilled in the art.

For example, as alternative method of the above-described embodiments, only the influence of the crosstalk of fz' with respect to fx, that is, the crosstalk correction coefficient a may be calibrated.

The present application has been described in detail with reference to the specific embodiments, but it is apparent that various modifications or alternations may be made by the person skilled in the art without departing from the spirit and the scope of the invention.

This application claims benefit of JP 2010-279201 A filed on Dec. 15, 2010, which is hereby incorporated by reference.

REFERENCE NUMERALS 1 rolling resistance testing machine
2 simulation road surface
3 running drum
4 carriage
4a vertical wall portion
5 spindle shaft
6 motor
7 rotation torque meter
8 housing
9 linear guide
10 hydraulic cylinder
11 control unit
12 measurement unit
13 calibration unit
14 load detector
15 bearing
T tire

The invention claimed is:

1. A method of calibrating a multi component force detector provided in a rolling resistance testing machine including a spindle shaft to which a tire is attached, a running drum with a simulation road surface on which the tire is pressed, and a rotation torque meter provided in a rotation shaft of the running drum, the method comprising steps of:
providing the multi-component force detector to the spindle shaft of the rolling resisting testing machine;
providing the rotation torque meter in the rotation shaft of the running drum;

measuring multi-component forces with the multi-component force detector;
measuring a rotation torque by the rotation torque meter; and
calculating a force acting on the tire based on the measurement values of the multi-component force detector using a crosstalk correction coefficient for calibrating an influence of crosstalk occurring in the multi-component force detector;
wherein, the crosstalk correction coefficient is calibrated by using rolling test data including the rotation torque measured by the rotation torque meter and the forces measured by the multi component force detector such that a rolling resistance obtained from the measured multi-component forces becomes equal to a rolling resistance obtained from the measured rotation torque.

2. The method of calibrating a multi component force detector provided in a rolling resistance testing machine according to claim 1,
wherein the multi component force detector is attached to the spindle shaft, and
wherein when a tangential direction of the running drum is set as an x axis, an axis direction of the spindle shaft is set as a y axis, and a direction of a load applied to the tire is set as a z axis, the multi component force detector is able to measure, among forces fx, fy, and fz acting in the respective axis directions and moments mx, my, and mz about the respective axes, at least two or more components including fx and fz.

3. The method of calibrating a multi component force detector provided in a rolling resistance testing machine according to claim 2,
wherein when the multi component force detector is able to measure fx, fz, and mx, the crosstalk correction coefficients of fz and mx with respect to fx are calibrated by using at least two kinds of rolling test data which include fx, fz, and mx and are linearly independent from one another.

4. The method of calibrating a multi component force detector provided in a rolling resistance testing machine according to claim 2,
wherein when the multi component force detector is able to measure fx, fz, and fy, the crosstalk correction coefficients of fz and fy with respect to fx are calibrated by using at least two kinds of rolling test data which include fx, fz, and fy and are linearly independent from one another.

5. The method of calibrating a multi component force detector provided in a rolling resistance testing machine according to claim 2,
wherein when the multi component force detector is able to measure fx, fz, fy, and mx, the crosstalk correction coefficients of fz, fy, and mx with respect to fx are calibrated by using at least three kinds of rolling test data which include fx, fz, fy, and mx and are linearly independent from one another.

6. The method of calibrating a multi component force detector provided in a rolling resistance testing machine according to claim 2,
wherein a differential load is obtained by subtracting a measurement value of the multi component force detector obtained when the tire is pressed at a load different from a test load from a measurement value of the multi component force detector obtained when the tire is pressed against the running drum at the test load, and
wherein the crosstalk correction coefficient is calibrated by using the obtained differential load as the rolling test data.

* * * * *